Oct. 14, 1958   F. J. KRUBEL   2,855,838
MOTOR TRUCK CAB VENTILATING MEANS
Filed June 21, 1954   3 Sheets-Sheet 1
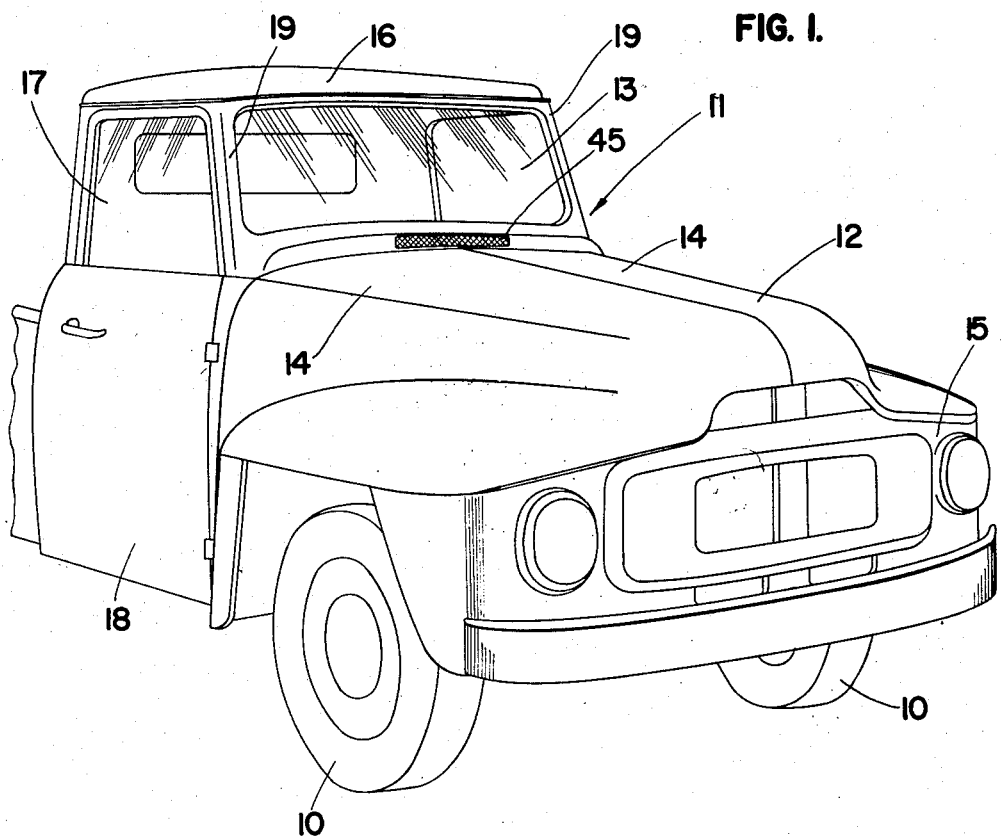
FIG. I.
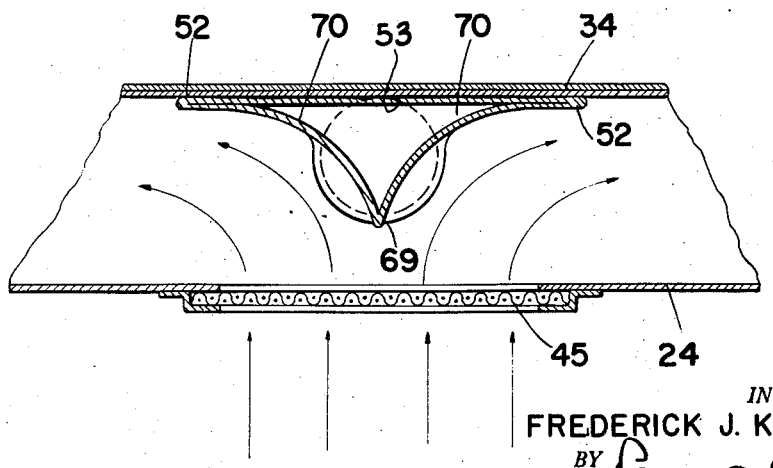
FIG. 5.
INVENTOR.
FREDERICK J. KRUBEL
BY Paul O. Pippel
ATTY.

Oct. 14, 1958

F. J. KRUBEL 2,855,838

MOTOR TRUCK CAB VENTILATING MEANS

Filed June 21, 1954

INVENTOR.
FREDERICK J. KRUBEL
BY
ATTY.

Oct. 14, 1958 F. J. KRUBEL 2,855,838
MOTOR TRUCK CAB VENTILATING MEANS
Filed June 21, 1954 3 Sheets-Sheet 3

INVENTOR.
FREDERICK J. KRUBEL
BY Paul O. Pippel
ATTY.

United States Patent Office 2,855,838
Patented Oct. 14, 1958

2,855,838

MOTOR TRUCK CAB VENTILATING MEANS

Frederick J. Krubel, Riverside, Ill., assignor to International Harvester Company, a corporation of New Jersey Application June 21, 1954, Serial No. 438,221

7 Claims. (Cl. 98—2)

This invention relates to a novel motor vehicle body construction and more particularly to ventilating air inlet and distributing means for an enclosed operator's compartment.

It is the primary objective of the present invention to provide a structure defining the upper forward limit of the operator's compartment fabricated out of sheet metal stampings of a relatively simplified form and having edge conformations adapting them for easy joinder to mating stampings and in which the assembled stampings enhance the strength and rigidity of the operator's compartment as a whole and serve as means for introducing and directing fresh air and heated air into the interior of the operator's compartment.

A further object is the provision of a fresh air plenum chamber spaced below the base of the windshield frame and above the level of the hood panel extending from one side of the operator's compartment to the opposite side adapted to receive air from without the operator's compartment at a single point substantially midway between the ends of the chamber and direct the same to the interior of the operator's compartment at two points contiguous to the ends of the chamber.

A still further object is to provide a heated air plenum chamber arranged in a side by side relation with a fresh air plenum chamber which extends transversely from one side of the operator's compartment to the opposite side thereof which has an air outlet means extending transversely substantially the full length of the base of the windshield frame.

Another object is provision of structure for directing a flow of fresh air from the exterior to the interior of the operator's compartment in a novel manner whereby the air flow is required to change directions three distinct times for a total of 270 degrees to thereby cause any water droplets borne by the incoming air to be separated therefrom before entering the operator's compartment.

Still another object is the provision of a pair of water drain tubes leading from the transversely spaced ends of the fresh air plenum chamber to the exterior of the operator's compartment.

A still further object is the provision of a nozzle for directing heated air to a hot air plenum chamber and which also serves as a means for dividing a single stream of incoming fresh air into two air streams having oppositely directed paths.

The foregoing and other important objects and desirable features inherent in and encompassed by the invention together with many of the purposes and uses thereof will become readily apparent from the reading of the ensuing description in conjunction with the annexed drawings, in which:

Figure 1 is a perspective view of the front portion of a motor truck embodying the invention;

Figure 5 is a sectional view taken substantially along line 5—5 of Figure 3.

Figure 2:
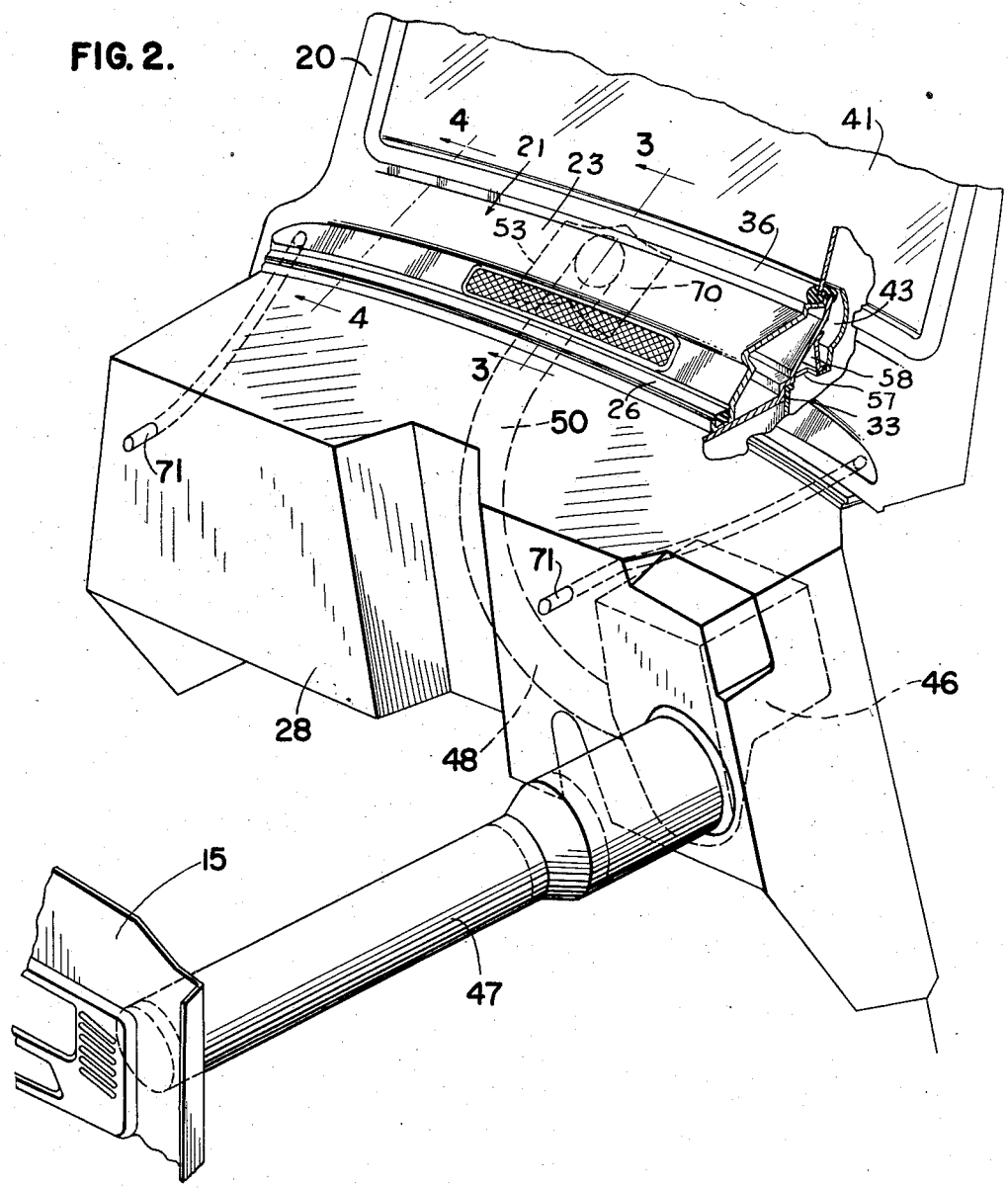
Figure 2 is a fragmentary perspective view partially cut away of the front portion of the operator's compartment or cab.
Figure 6:
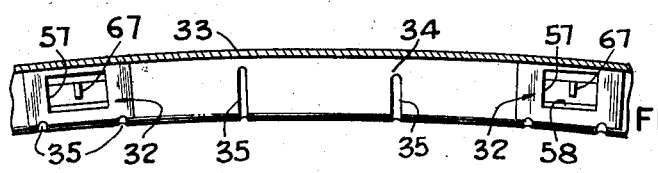
Figure 6 is a sectional view taken substantially along line 6—6 of Figure 3.

Referring to the drawings in detail, wherein like reference characters designate like elements throughout the various views, there is shown a motor truck having the invention incorporated therein. The motor truck includes a chassis frame, not shown, which has its front end resiliently suspended off the road by a pair of steerable ground-engaging wheels 10 in a conventional manner.

Mounted on the chassis frame is a body designated generally by numeral 11. The body 11 includes an engine compartment 12 and an enclosed operator's compartment 13 longitudinally spaced rearwardly of the engine compartment. The top and forward walls of the engine compartment 12 are defined by a pair of symmetrical hood panels 14 and a vertical grille panel 15, respectively.

The operator's compartment 13 is supported on the chassis frame rearwardly of the engine and comprises a roof 16 having one end connected to a back panel 17. The sides of the operator's compartment 13 are formed by doors 14 which have their forward edges hingedly connected respectively to transversely spaced, vertical pillar posts 19. The windshield frame 20 is formed as a unitary stamping with a forwardly extending cowl panel 21. The top edge of the windshield frame 20 is rigidly secured to the forward edge of the roof 16 by any suitable means and the bottom ends of the unitary stamping are similarly connected to the pillar post 18, as shown in Figure 1.

A continuous, inwardly directed flange 22 outlines the windshield opening for a purpose which will be pointed out hereinafter. Cowl panel 21 includes a horizontally extending section 23 vertically spaced above the hood panel 14 and an integrally formed inclined section 24 depending angularly from the horizontal section 23. The transverse ends of the horizontal section 23 slope downwardly and outwardly, rather abruptly, and are suitably secured as by welding to the uppermost ends of the pillar posts 18. The lower edge of the inclined section 24 is in the form of an upwardly facing channel 25 which serves as a pocket for retaining a strip 26 of rubber or like material. The rearwardmost edges of the hood panels 14 are adapted to abut the strip 26 and prevent the entrance of water, dirt, etc., into the engine compartment 13.

Extending transversely from one side of the operator's compartment 13 to the opposite side is a cowl bar 27 which has its extreme forward marginal edge rigidly secured to a generally vertically disposed dash panel or fire wall 28. Dash panel 28 serves as a common wall for separating the engine compartment 12 from the operator's compartment 13. The cowl bar 27 includes a section 29 extending rearwardly from the dash panel 28 which is vertically spaced below the horizontal section 23 of the cowl panel 21 and is welded to the underside of the channel 25. Cowl bar 27 further includes an upwardly and rearwardly inclined section 30. The upper marginal edge of the inclined section 30 is in the form of a flange 31 which is welded to a portion of the flange 22. Each transverse end of the cowl bar 27 is suitably secured as by welding, to a respective transverse, downwardly sloping end portion or end wall of the cowl panel 21 adjacent a pillar post 18. By virtue of the above described structure it will be appreciated that the cowl panel 21 and the cowl bar 27 form a hollow structure which extends transversely across the vehicle and has a box section which greatly improves the strength and rigidity of the truck cab without materially increasing the weight thereof. The downwardly sloping end portions of the cowl panel section 23 close the ends of the hollow structure.

Figure 3:
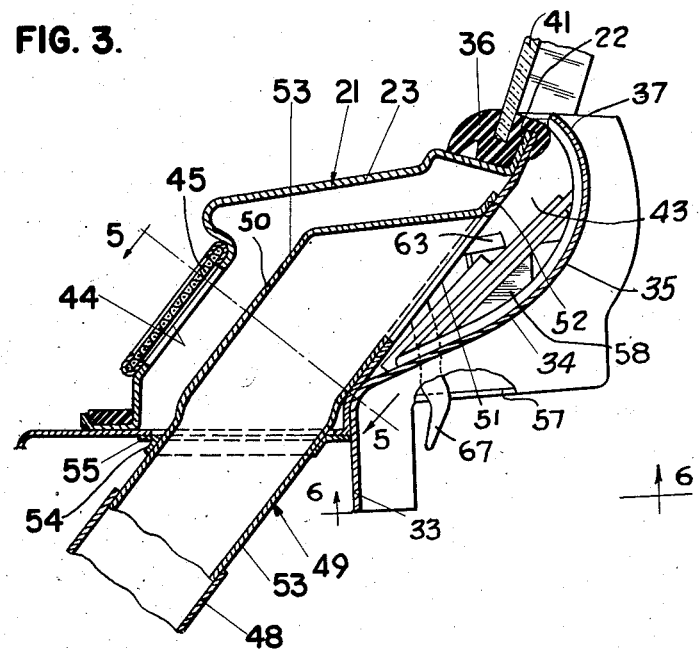
Fig. 3 is a sectional view taken substantially along line 3—3 of Figure 2.
Figure 4:
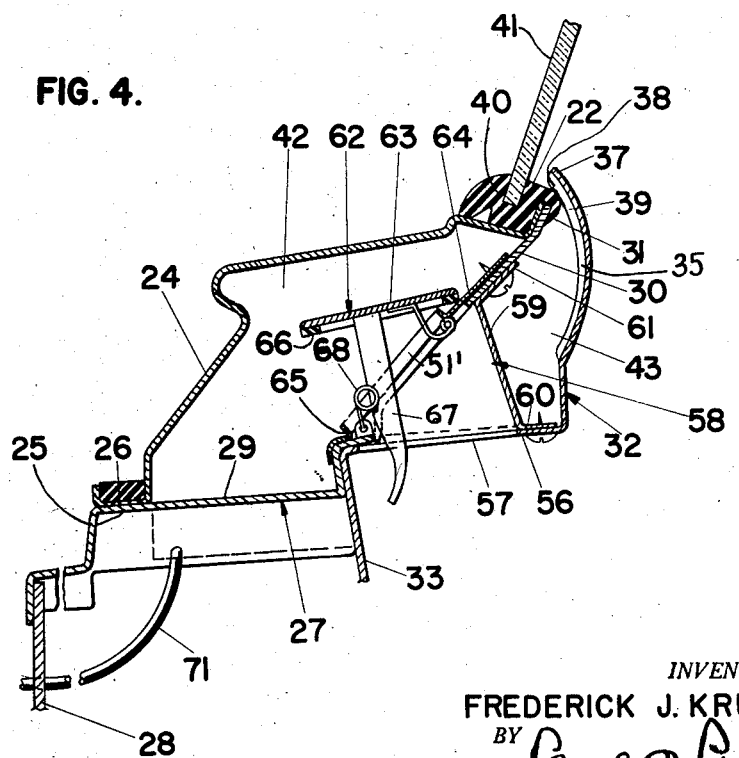
Figure 4 is a sectional view taken substantially along line 4—4 of Figure 2.

The instrument panel, designated generally by numeral 32, also extends the full width of operator's compartment 13 and serves as a support for the various engine and accessory control devices and gauges such as the speedometer, choke, ignition switch, not shown, as in conventional motor trucks. Instrument panel 32 includes a generally vertical section 33 spaced rearwardly of the dash panel 28 and an integrally formed rearwardly and upwardly curved section 34. The instrument panel section 33 is welded to the inclined section 30 of the cowl bar 27 at the junction of the inclined section and the horizontal section 29, as best shown in Figures 3 and 4, and the transverse ends of the instrument panel 32 are suitably secured to the downwardly sloping end portions of the cowl panel section 23. The curved section 34 of the instrument panel 32 is provided with a plurality of elongated depressions which form ribs 35, only one is shown in Figure 4. The ribs 35 strengthen and rigidify the instrument panel 32 and the uppermost ends thereof are adapted to abut the portions of a rubber mounting strip 36. Consequently, the terminal edge 37 of the curved portion 34 is maintained in a fixed spaced relationship with the adjacent flanges 22 and 31 to provide an elongated slot 38 which extends substantially the entire width of the operator's compartment 13 and is disposed at the base of the windshield frame 20. The rubber mounting strip 36 has an outwardly opening groove 39 which embraces the flanges 22 and 31 at the base of the windshield frame 20 for securing the strip in place and an inwardly opening groove 40 for receiving the peripheral edge of the windshield glass pane 41. By virtue of the above described structure it is to be understood that two plenum chambers 42 and 43 extending transversely across the vehicle below the base of the windshield frame 20 and arranged in a side by side relation are formed. Inclined section 30 of the cowl bar 27 serves as a common wall for the plenum chambers 42 and 43 and the transverse ends of both chambers 42, 43, are closed and defined by the sloping, generally vertically disposed end portions of the cowl panel section 23.

A single elongated opening 44 disposed substantially midway between the transversely spaced ends of the plenum chamber 42 is provided in the inclined section 24 of the cowl panel 21. It will be appreciated that the inclined section 24 serves as a forward wall of the plenum chamber 42 and hence it will be apparent that fresh air is forced into the chamber 42 when the vehicle moves forwardly. A screen assembly 45 is suitably fastened to the inclined section 24 over the opening 44 to prevent bugs, dirt and other foreign elements from entering the chamber 42.

As shown in Figure 2 a conventional fresh air intake pipe 47 for the heater 46 extends between an opening in the grille panel 15 and the heater. Heated air discharged from the heater 46 flows through a pipe 48 to a nozzle 49 having an enlarged head 50. Temperature of the air flowing from the heater is controlled by conventional means which are not shown. Inclined section 30 of the cowl bar 27 is formed with an opening 51 substantially midway between its transverse ends and a continuous outwardly extending flange 52 formed on the nozzle head 50 about the discharge opening thereof is suitably secured to the peripheral surface of the cowl bar 27 outlining the opening 51 therein. Portion 53 of the nozzle 49 extends downwardly through an opening in the rearwardly extending section 29 of the cowl bar 27 and the pipe 48 is connected thereto. Collar 54 is suitably secured to the portion 53 of the nozzle 49 and is provided with an outwardly extending flange 55 which is secured to the underside of the cowl bar rearwardly extending section 29 about the opening therein. From the foregoing it will be appreciated that heated air is capable of flowing through the pipe 48 and nozzle 49 to the plenum chamber 43 at a point midway between its transverse ends. Heated air flows through the slot 38 and is thus distributed and discharged along the entire length of the windshield frame 20 at the base thereof to prevent the formation of ice and moisture on the windshield glass pane 41.

Two transversely spaced portions 56 of the curved section 34 of the instrument panel 32 are formed to lie in a substantially horizontal plane. Portions 56 are each provided with a rectangular port 57 which opens downwardly into the operator's compartment 13 rearwardly of the vertical section 33 of the instrument panel 32. It will be noted that the ports 57 are transversely spaced from the air intake opening 44 in the cowl panel section 24 and are disposed on respective opposite sides thereof and are each substantially in longitudinal alignment with a respective opening 51' formed in the inclined section 30 of the cowl bar 27. Duct 58 leads from each opening 51 to a respective port 57 for providing air communication between the plenum chamber 42 and the interior of the operator's compartment 13. Each duct 58 includes a sheet metal member 59 having its lower end provided with a flange 60 which is secured to the instrument panel section 34 about three sides of a respective port 57. A second flange 61 abuts a cowl bar inclined section 30 adjacent the top and side marginal edges of the opening 51' therein and is suitably secured thereto. The ducts 58 direct the incoming horizontal fresh air stream from plenum chamber 42 through hot air plenum chamber 43 and downwardly into the interior of the operator's compartment 13. Ducts 58 change the direction of air flow substantially 90 degrees since the air flows into the duct 58 in substantially horizontal streams and leaves the ducts in vertical stream. It will also be appreciated that the ducts 58 strengthen and rigidify the instrument panel 32.

In order to regulate the volume of fresh air entering the ducts 58 and thus the operator's compartment 13, a ventilator valve device, designated generally by numeral 62, is provided for each duct 58. Each ventilator valve device 62 includes a closure member 63 which is pivotally mounted to a mounting plate 64. Mounting plates 64 are each provided with an opening therein encircled by a raised lip 65 and are adapted to be secured to the cowl bar inclined section 30 whereby the closure members 63 are capable of swinging about horizontal axes between fully opened positions shown, in Figure 3, and closed positions wherein a strip 66 of rubber or like material fastened to the underside of each closure member 63 adjacent its marginal edge abuts a respective lip 65. In the closed position air, water and dirt are prevented from flowing through the ports 57 to the interior of the operator's compartment 13. Attached to each closure member 63 is an operating handle 67 which extends downwardly through a respective port 57 and is conveniently grippable by the operator to rock the closure member between its open and closed position. Each closure member 63 is maintained in either of its two positions of adjustment by means of an overcenter spring 68 which has one end attached to a respective operating handle 67 and is oppositely and pivotally supported by the cowl bar inclined section 30.

The nozzle head 50 which is spaced rearwardly of and substantially in horizontal and longitudinal alignment with the opening 44 in the cowl panel inclined section 24 is formed with a raised, sharp central portion 69 which is contained in a vertical plane passing through the longitudinal median line of the vehicle. Portions 70 on each side of the central portion 69, as best shown in Figure 5, are curved and gradually merged into flange 52. By virtue of the above construction, the fresh air flowing substantially horizontally through the opening 44 when the vehicle is in forward motion is divided into two oppositely directed air streams within the plenum chamber 42. One air stream flows transversely and substantially horizontally from the longitudinal median line of the vehicle toward one end of the plenum chamber 42 and the other air stream flows in the same manner toward the opposite end of the plenum chamber 42, as indicated by arrows. It will be appreciated therefore that the initial flow of air is caused to change its direction 90 degrees.

The rearwardly extending section 29 of the cowl bar 27 which forms a bottom wall of the plenum chamber 42 slopes slightly downwardly from the center toward the end portions thereof whereby the end portions are disposed at a lower level than the center portion. Each of the air streams flowing from the center of the plenum chamber 42 transversely toward a respective end thereof is again required to change its direction 90 degrees before entering one of the ducts 58. It will be appreciated that any water droplets formed by the incoming air are caused to be substantially separated therefrom before entering the ducts 58 by requiring the air flow to make two distinct 90 degrees changes in direction. Water droplets separated from the air streams have a tendency to collect at the ends of the plenum chamber 42 because of the relative lower levels thereof with respect to the center of the plenum chamber 42. A pair of small drain tubes 71 are provided for establishing fluid communication between the ends of the plenum chamber 42 and the engine compartment 12 and for permitting escape of the water collected in the plenum chamber 42 to points exteriorly of the operator's compartment 13.

The embodiment of the invention chosen for the purposes of illustration and description herein is that preferred for achieving the objects of the invention and developing the utility thereof in a most desirable manner, due regard being had to existing factors of economy, simplicity of design and construction, and the improvement sought to be effected. It will be appreciated therefore that the particular structural and functional aspects emphasized herein are not intended to exclude, but rather to suggest such other adaptations and modifications of the invention as fall within the spirit and scope of the invention as defined in the appended claims.

What is claimed is:

1. In a motor vehicle having an operator's compartment provided with a windshield frame extending transversely with respect to the motor vehicle, a hood panel structure spaced forwardly of said operator's compartment and below the base of said windshield frame, the combination comprising, a structure defining a hot air receiving chamber, said chamber extending transversely from side to side of said operator's compartment and being spaced below said windshield frame and above said hood panel and having an elongated discharge opening in the uppermost portion thereof, said opening being disposed adjacent to and rearwardly of the base of said windshield frame, means for conveying heated air to said chamber including a nozzle head secured to the front wall of said chamber substantially midway between its transversely spaced ends; fresh air intake means vertically spaced between said hood panel structure and the base of said windshield frame for receiving air flowing substantially longitudinally and horizontally, said air intake means being in substantially longitudinal alignment with said nozzle head, said air intake means further being substantially in horizontal alignment with said nozzle head, conducting means for conveying and directing fresh air substantially horizontally and transversely in opposite directions from said air intake means including said front wall of said hot air plenum chamber and said nozzle head, and duct means in air communication with said conducting means and the interior of said operator's compartment, said duct means being constructed and arranged to require fresh air received thereby from said conducting means to flow vertically before entering the interior of the operator's compartment.

2. In a motor vehicle having an operator's compartment provided with a windshield frame extending transversely with respect to the motor vehicle, a hood panel structure spaced forwardly of said operator's compartment and below the base of said windshield frame, the combination comprising, a structure defining a pair of plenum chambers extending transversely from side to side of the operator's compartment and being arranged in a side-by-side relation, said chambers being spaced below said windshield frame and above said hood panel structure and having a common wall separating them, the front wall of the forwardmost plenum chamber being provided with a single, centrally located opening therein for receiving fresh air when the vehicle is in forward motion, means for conveying heated air to the rearwardmost chamber including a nozzle head secured to said common wall substantially midway between its transversely spaced ends, said nozzle head being substantially in longitudinal alignment with said opening in said front wall and having a relatively sharp central portion contained in a vertical plane and projecting forwardly of said common wall toward said front wall to thereby guide and divide the fresh air flowing through said opening in said front wall into two substantially horizontal air streams flowing transversely in opposite directions, said rearwardmost chamber having an outlet opening therein adjacent to and rearwardly of the base of said windshield frame, and means for conducting fresh air from said forwardmost plenum chamber to the interior of said operator's compartment.

3. In a motor vehicle having an operator's compartment, the combination comprising, a structure defining a pair of plenum chambers extending transversely from side to side of the operator's compartment and being arranged in a side-by-side relation, said chambers having a common wall separating them, the front wall of the forwardmost plenum chamber being provided with a single, centrally located opening therein for receiving fresh air when the vehicle is in forward motion, means for conveying heated air to the rearwardmost chamber including a nozzle head secured to said common wall substantially midway between its transversely spaced ends, said nozzle head being substantially in longitudinal alignment with said opening in said front wall and having a relatively sharp central portion contained in a vertical plane and projecting forwardly of said common wall toward said front wall to thereby guide the fresh air flowing through said opening in said front wall into two transversely oppositely directed air streams, the uppermost wall portion of said rearwardmost plenum chamber having a discharge opening therein rearwardly of the base of said windshield frame and opening into the interior of said operator's compartment and means for conducting fresh air from said forwardmost plenum chamber to the interior of said operator's compartment.

4. In a motor vehicle having an operator's compartment, the combination comprising, a structure defining a pair of plenum chambers extending transversely from side to side of the operator's compartment and being arranged in a side-by-side relation, said chambers having a common wall separating them and the front wall of the forwardmost plenum chamber being provided with a single, centrally located opening therein for receiving fresh air when the vehicle is in forward motion, a portion of the wall of the rearwardmost plenum chamber having an opening therein for discharging heated air to the interior of said operator's compartment, means for conveying heated air to the rearwardmost chamber including a nozzle head secured to said common wall substantially midway between its transversely spaced ends, said nozzle head being substantially in longitudinal alignment with said opening in said front wall and having a relatively sharp central portion contained in a vertical plane and projecting forwardly of said common wall toward said front wall to thereby guide and divide the fresh air flowing through said opening in said front wall into two substantially horizontal air streams flowing transversely in opposite directions, and means contiguous to each end of said forwardmost plenum chamber for conducting fresh air from said forwardmost plenum chamber to the interior of said operator's compartment.

5. In a motor vehicle having an operator's compartment, the combination comprising, a structure defining a plenum chamber extending transversely from side to side of the operator's compartment, the front wall of the plenum chamber being provided with a single, centrally located opening therein for receiving fresh air when the vehicle is in motion and the rear wall having an opening therein in air communication with the interior of said operator's compartment, a hollow deflector secured to the back wall of said plenum chamber substantially midway between its transversely spaced ends and covering said opening therein, said deflector having an opening in registry with said back wall opening, said deflector being substantially in longitudinal alignment with said opening in said front wall and having a relatively sharp central portion contained in a vertical plane and projecting forwardly of said back wall toward said front wall to thereby guide and divide the fresh air flowing through said opening in said front wall into two substantially horizontal air streams flowing transversely in opposite directions, means for introducing heated air to the interior of said hollow deflector, and means contiguous to the ends of said plenum chamber for conducting fresh air from said plenum chamber to the interior of said operator's compartment.

6. In a motor vehicle substantially as set forth in claim 5, in which the transversely spaced end portions of the bottom wall of said plenum chamber are disposed at a lower level than the central portion thereof, and drain tube means are provided, said drain tube means being secured to the end portions of said bottom wall and opening into said plenum chamber, said drain tube means leading from said plenum chamber to points exterior of the operator's compartment.

7. In a motor vehicle having an operator's compartment provided with a windshield frame extending transversely with respect to the motor vehicle, a hood panel structure spaced forwardly of said operator's compartment and below the base of said windshield frame, an instrument panel disposed within said operator's compartment having a generally vertical section thereof spaced below said windshield frame, the combination comprising, a fresh air conducting means extending between a single point disposed exteriorly of said operator's compartment and a single pair of transversely spaced points disposed within said operator's compartment and vertically spaced below the base of said windshield frame and said single point disposed exteriorly of said operator's compartment, said single point being vertically spaced between said hood panel structure and the base of said windshield frame and transversely spaced substantially midway between the sides of said operator's compartment, said single pair of points being transversely spaced on respective opposite sides of the longitudinal median line of the motor vehicle and spaced rearwardly of said instrument panel vertical section, said fresh air conducting means including a plenum chamber disposed below the base of said windshield frame and extending transversely substantially the full length thereof, said plenum chamber including a front wall, a back wall, and a bottom wall, said front wall being provided with a single air intake opening therein transversely spaced substantially midway between the ends of said chamber, said back wall being provided with a single pair of transversely spaced air emitting openings therein, each of said air emitting openings being transversely spaced between a respective end portion of said chamber and the longitudinal median line of the motor vehicle, the transversely spaced end portions of said bottom wall being spaced vertically below the level of the central portion thereof and the level of the air emitting openings, said instrument panel including a section extending downwardly and forwardly from the base of said windshield frame having a pair of transversely spaced portions disposed substantially in horizontal planes, each of said horizontal portions having a port therein, and duct means extending between said back wall of said chamber and said transversely spaced portions disposed substantially in horizontal planes of said instrument panel section and being entirely disposed between said instrument panel section and said chamber back wall, each of said duct means providing air communication between an air emitting opening and a respective port; and drain tube means extending from the end portions of said chamber to points exteriorly of the operator's compartment.

References Cited in the file of this patent

UNITED STATES PATENTS

| | | |
|---|---|---|
| 1,626,893 | Twyman et al. | May 3, 1927 |
| 2,045,578 | Buford | June 30, 1936 |
| 2,104,394 | Halblieb | Jan. 4, 1938 |
| 2,520,623 | Collins | Aug. 29, 1950 |
| 2,756,665 | Lee | July 31, 1956 |